United States Patent [19]

Conger, Sr.

[11] 4,019,858
[45] Apr. 26, 1977

[54] CONCENTRATED DIRECT DYE SOLUTION AND PROCESS THEREFOR

[75] Inventor: Joseph Clyde Conger, Sr., Somerville, N.J.

[73] Assignee: American Cyanamid Company, Stamford, Conn.

[22] Filed: May 21, 1975

[21] Appl. No.: 579,360

[52] U.S. Cl. .............................. 8/85 R; 260/172; 260/178; 260/184; 260/191; 260/205
[51] Int. Cl.² ................ C09B 67/00; D06P 1/645
[58] Field of Search .......... 260/191, 184, 178, 172; 8/85, 83, 82

[56] References Cited

UNITED STATES PATENTS

| | | | |
|---|---|---|---|
| 2,928,712 | 3/1960 | Bradshaw | 8/85 |
| 2,981,729 | 4/1961 | Kesler et al. | 260/191 |
| 3,023,071 | 2/1962 | Jiroy | 8/55 |
| 3,521,989 | 7/1970 | Angliss et al. | 8/54 |
| 3,635,944 | 1/1972 | Litke | 260/191 |

OTHER PUBLICATIONS

Beilstein, "Handbuch der Organischen Chemie", vol. 16, Second Supplement, p. 234 (1951).
Ambrect et al., Chemical Abstracts, vol. 77, Item No. 166142n (1972).

*Primary Examiner*—Floyd D. Higel
*Attorney, Agent, or Firm*—John L. Sullivan

[57] ABSTRACT

A concentrated dye solution comprising the direct red dye:

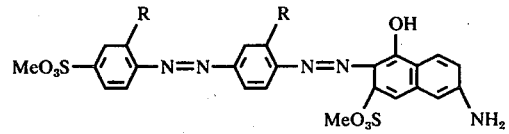

where Me is an alkali metal and R is hydrogen, methyl or ethyl ater and urea; and a method for its preparation in situ by a defined sequence of process steps are disclosed.

4 Claims, No Drawings

CONCENTRATED DIRECT DYE SOLUTION AND PROCESS THEREFOR

This invention relates to a red dye solution and to a process for its preparation. More particularly, it relates to a highly concentrated direct dye solution which is stable at low temperatures and is suitable for dyeing fiberglass with the aid of a synthetic resin binder, and to a process for its manufacture.

There is and has been a need for a concentrated red dye solution to be used in dyeing fiber glass in combination with a synthetic resin binder of the phenolic type. The dye solution must be highly concentrated, i.e., of high tinctorial value, and it must be compatible with the phenolic resin. It should be stable at temperatures below about 0° C., i.e., should not crystallize out of solution, and at high temperatures used for curing the phenolic resin.

It is, therefore, an object of this invention to provide a highly concentrated dye solution meeting the above requirements. It is another object to provide a novel and effective method for the preparation of a highly concentrated dye solution.

The aforesaid objects are accomplished by the present invention whereby there is provided a concentrated red dye solution comprising a dye, represented by the following structure,

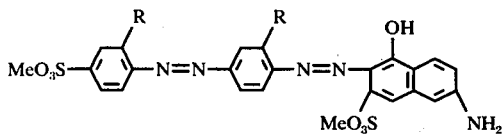

where Me is an alkali metal and R is hydrogen or a methyl or ethyl radical; water and urea, and a method for the preparation in situ of said dye solution by a novel sequence of steps.

The dye molecules represented above are old and known. They are readily made by conventional techniques by diazotization of, for example, aminoazobenzene sulfonic acid following by coupling into J-Acid (1-hydroxy-6-aminonaphthalene-3-sulfonic acid).

If the dyes are prepared according to conventional means, isolated and dried, they can be redissolved in water to form a highly concentrated solution, e.g. about 30%, only with considerable difficulty, especially where R = H. For example, it is known to dissolve the dyes with the assistance of methyl Carbitol, or similar glycol ethers, and lithium hydroxide. Such solutions will contain as much as 35% methyl Carbitol and 35% water; lithium hydroxide and salts from the dye.

When the dye solution is prepared in accordance with the present invention a concentration of about 30% dye (commercial strength*) can be obtained with the solubilizing assistance of only 15–16% urea. This solution (of the dye prepared from 4-aminoazobenzene sulfonic acid) is stable at temperatures as low as −20° C. Moreover, if any dye does crystallize out of solution at these low temperatures it readily redissolves even at temperatures as low as 0° C. Dye solutions containing 30% dye can also be obtained in accordance with this invention using only 7–8% urea; however, the solution is subject to crystallization at 0° C.

*Commercial strength means about 12–13% real dye + 17–18% process salts.

If the dye solution is prepared in accordance with the novel sequence of steps described hereinbelow and methyl Carbitol used as a solubilizing agent the dye will not stay in solution, probably because the methyl Carbitol tends to concentrate the salt phase. Similarly, using lithium hydroxide as a solubilizing assistant fails to keep the dye in solution.

The dye solution of the invention is also economically attractive since it is prepared in situ as a concentrated solution and contains all the salts formed in the reaction which are normally washed out with dilute brine. Moreover, the procedure completely eliminates any effluent problem.

The method used to prepare the dye solution requires a critical sequence of steps since a minimum amount of water, necessary to insure maximum dye concentration in situ, must be used in both the diazotization reaction and in the coupling reaction. In so doing the completed dye solution will contain about 38%* dye in aqueous solution. This aqueous solution of dye will not be stable at low temperatures, i.e., it will crystallize out. In accordance with the invention, complete solubility at low temperature is achieved by adding to the solution sufficient urea so that the resulting solution will contain 29–31% dye and 15–16% urea, weight basis (salts formed in the reaction also are retained in solution). Water is added to adjust strength of all lots to a common level of 30% commercial dye strength.

*Commercial strength; actually 15–16% real + process salts.

Thus, using a minimum amount of water, 4-aminoazobenzene-4'-sulfonic acid is diazotized using conventional diazotization procedures. The resulting diazo of 4-aminoazobenzene-4'-sulfonic acid is a thick slurry. Preferably, the water used is 5.5 to 6.5 times the weight of 4-aminoazobenzene-4'-sulfonic acid.

The coupling component, 1-hydroxy-6-aminonaphthalene-3-sulfonic acid (J-Acid), one-fourth the required amount, and one-half the required amount of soda ash, in the minimum amount of water required to permit the thick slurry to be stirred (6–7 parts water/part J-Acid) is then reacted at room temperature, in the following sequence, with (1) one-fourth the previously prepared diazo, (2) one-fourth the coupling component and (3) an additional one-fourth of the diazo. This sequence is necessary to retain the ability to stir the reaction mixture. At this stage of the reaction, surprisingly, the reaction mixture is less viscous than either the previously prepared diazo or the initial coupling component mixture. The reaction is then continued by adding the remaining one-half the soda ash, the remaining one-half of the coupling component, followed by the remaining one-half of the diazo. The completed dye is then stirred for a short time to insure complete solution.

The concentration of dye in solution following the above sequence is about 38% by weight. This solution is not stable, i.e., will crystallize out at low temperatures. Complete solubility and low temperature stability is achieved by adding sufficient urea to achieve a solution containing 29–31% dye and 15–16% urea (salts formed in the reaction are retained in solution). Water also is added to adjust each lot to a common strength level, i.e., 30% dye concentration (commercial strength).

The invention is more completely illustrated by the following examples.

EXAMPLE 1

Preferred Embodiment of the Invention

Diazotization of 4-Aminoazobenzene-4'-Sulfonic Acid

4-Aminoazobenzene-4'-sulfonic acid (68 grams real) is slurried in 400 ml. water, containing 1 gram Tamol SN (sodium salt of condensed naphthalene sulfonic acid) and 1 gram Surfonic N-95 (alkylaryl polyethylene glycol ether) to aid in making the slurry. To this slurry is added 63 ml. of 32% hydrochloric acid, the mixture cooled to 15°–30° C., and 63 ml. of a 25% aqueous solution of sodium nitrite added. Following diazotization, the volume is adjusted to 600 ml. with water, resulting in a thick viscous slurry.

Coupling with 1-Hydroxy-6-Aminonaphthalene-3-Sulfonic Acid

With stirring, 32.5 grams (½ the required amount) of soda ash is added to 100 ml. water, followed by 16 grams (¼ the required amount) of J-Acid. At room temperature, the viscous slurry is stirred and reacted with ¼ of the previously prepared slurry of diazotized amine, followed by 16 grams of the coupling component and then an additional ¼ of the diazotized amine. During the sequence of additions, the viscosity of the reaction mixture becomes increasingly reduced, and the mixture is readily stirred. Then, 32.5 grams of soda ash and 32 grams coupling component are added, followed by the remaining diazotized amine. The dye solution is then stirred for an additional 30 minutes and 200 grams of urea are added. The solution is adjusted with water to provide a solution containing 29–31% dye and 15–16% urea.

When the above dye solution was cooled, crystallization of the dye began at a temperature of about −20° C. On warming to about 0° C. all the crystallized dye returned to solution.

EXAMPLE 2

When the procedure of Example 1 was followed except that 64 grams of J-Acid, the total amount required, was added with stirring to 100 ml. water. A solid immovable mass resulted.

EXAMPLE 3

When the procedure of Example 1 was followed except for the addition of only 100 grams of urea, the resulting solution of dye crystallized on cooling to 0° C and would not redissolve readily on warming to room temperature. The dye redissolved when heated to 40° C.

EXAMPLE 4

The dye was prepared in a conventional manner by diazotization and coupling in solution, isolating the dye, washing out salts and drying. An attempt was made to prepare a concentrated (30%) solution by dissolving the dry dye in water. The maximum concentration obtained was 22%. Addition of methyl Carbitol to aid in solution of the dye did not prevent crystallization of the dye on cooling to 0° C. The further addition of lithium hydroxide also failed to stabilize the solution against crystallization at low temperature.

EXAMPLE 5

The dye solution of Example 1 is mixed with an aqueous solution of a phenol-formaldehyde resin and the mixture sprayed onto a fiberglass batting. The batting is then heated for 3 minutes in an oven at 450° F. to cure the resin. The fiberglass thus dyed has the same red shade as dyeings made without the curing step, illustrating that the dye is stable at elevated temperatures.

I claim:

1. A concentrated dye solution comprising per 100 parts by weight thereof, 54–55 parts of water, 17–18 parts of process salts, 15–16 parts of urea and 12–13 parts of a dye having the formula:

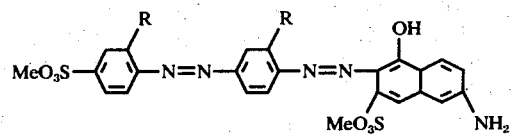

where Me is an alkali metal and R is H, —CH$_3$ or —C$_2$H$_5$.

2. A dye solution of claim 1 where R is H.

3. A method for the preparation in situ of a dye solution according to claim 1 comprising the steps of:

a. diazotizing an amine of the formula:

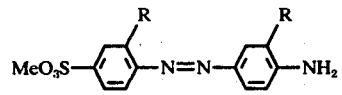

where R is H, —CH$_3$ or —C$_2$H$_5$ in the minimum amount of water necessary to achieve a readily stirrable mixture and provide a stirrable slurry of the diazotized amine, b. forming a slurry of 1-hydroxy-6-aminonaphthalene-3-sulfonic acid and soda ash in the minimum amount of water necessary to achieve a stirrable slurry at room temperature, said slurry comprising ¼ of the amount of 1-hydroxy-6-aminonaphthalene-3-sulfonic acid and ½ the amount of sode ash required to couple with the diazotized amine formed in (a), c. stirring the slurry from step (b) and adding thereto ¼ of the diazotized amine slurry from step (a), then an additional ¼ of the 1-hydroxy-6-aminonaphthalene-3-sulfonic acid and then an additional ¼ of the diazotized amine slurry from step (a), d. adding to the reaction mixture resulting from step (c) the remaining ½ of soda ash, then the remaining ½ of 1-hydroxy-6-aminonaphthalene-3-sulfonic acid and finally the remaining ½ of the diazotized amine slurry from step (a), e. stirring the solution of dye resulting from step (d) and f. adding urea to the stirred dye solution.

4. A method according to claim 3 wherein the amine used in step (a) has the formula:

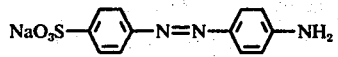

* * * * *